United States Patent
Aronowitz

(10) Patent No.: US 9,792,899 B2
(45) Date of Patent: Oct. 17, 2017

(54) DATASET SHIFT COMPENSATION IN MACHINE LEARNING

(71) Applicant: International Business Machines Corporation, Armonk, NY (US)

(72) Inventor: Hagai Aronowitz, Petah Tikva (IL)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 14/331,230

(22) Filed: Jul. 15, 2014

(65) Prior Publication Data

US 2016/0019883 A1    Jan. 21, 2016

(51) Int. Cl.
| | | |
|---|---|---|
| *G10L 15/06* | (2013.01) | |
| *G10L 17/04* | (2013.01) | |
| *G10L 17/26* | (2013.01) | |
| *G10L 15/20* | (2006.01) | |
| *G10L 17/20* | (2013.01) | |
| *G10L 21/0208* | (2013.01) | |

(52) U.S. Cl.
CPC ............ *G10L 15/063* (2013.01); *G10L 17/04* (2013.01); *G10L 15/20* (2013.01); *G10L 17/20* (2013.01); *G10L 17/26* (2013.01); *G10L 21/0208* (2013.01)

(58) Field of Classification Search
CPC ......... G10L 17/02; G10L 15/07; G10L 15/08; G10L 17/04
See application file for complete search history.

(56) References Cited

U.S. PATENT DOCUMENTS

| | | |
|---|---|---|
| 5,995,927 A | 11/1999 | Li |
| 6,990,446 B1 | 1/2006 | Huang et al. |
| 2008/0059156 A1* | 3/2008 | Han ........................ G10L 15/08 704/207 |

(Continued)

FOREIGN PATENT DOCUMENTS

| | | |
|---|---|---|
| CN | 102270451 | 12/2011 |
| EP | 2182512 | 5/2010 |
| WO | 2004095423 | 11/2004 |

OTHER PUBLICATIONS

Kanagasundaram, Ahilan, et al. "Improving short utterance i-vector speaker verification using utterance variance modelling and compensation techniques." Speech Communication 59 (2014): 69-82.*

(Continued)

*Primary Examiner* — Douglas Godbold
*Assistant Examiner* — Mark Villena

(57) ABSTRACT

A method for inter-dataset variability compensation, the method comprising using at least one hardware processor for: receiving a heterogeneous development dataset comprising multiple samples and metadata associated with at least some of the multiple samples; dividing the multiple samples into multiple homogenous subsets, based on the metadata; averaging high-level features of each of the multiple homogenous subsets, to produce multiple central high-level features for the multiple homogenous subsets, respectively; computing an inter-dataset variability subspace spanned by the multiple central high-level features; removing the inter-dataset variability subspace from the high-level features of the multiple homogenous subsets, to produce denoised samples; and training a machine learning system using the denoised speech samples.

20 Claims, 13 Drawing Sheets

(56) References Cited

U.S. PATENT DOCUMENTS

| | | | |
|---|---|---|---|
| 2011/0040561 A1* | 2/2011 | Vair | G10L 17/04 704/240 |
| 2014/0088961 A1* | 3/2014 | Woodward | G10L 15/22 704/235 |
| 2014/0142944 A1* | 5/2014 | Ziv | G10L 17/02 704/250 |
| 2014/0222423 A1* | 8/2014 | Cumani | G10L 17/02 704/234 |

OTHER PUBLICATIONS

Carlos Vaquero, "Dataset Shift in PLDA based Speaker Verification", in Proc. Speaker Odyssey, 2012, Singapore.

Hagai Aronowitz,"Inter Dataset Variability Compensation for Speaker Recognition", Odyssey 2014, The Speaker and Language Recognition Workshop, Jun. 2014, Finland.

Hagai Aronowitz, "Adaptation of PLDA to New Domains", presented in the Johns Hopkins Speaker Recognition Workshop, Jul. 2013.

Solomonoff et al., "Nuisance Attribute Projection", in Speech Communications, Amsterdam, May 2007.

Lei et al., "Mismatch Modeling and Compensation for Robust Speaker Verification", Speech Communication, vol. 53, Issue 2, Feb. 2011, pp. 257-268.

Hassan et al., "On Acoustic Emotion Recognition: Compensating for Covariate Shift", IEEE Transactions on Audio, Speech and Language Processing, vol. 21, Issue 7, Jul. 2013, pp. 1458-1468.

Jasus Villalba, "Bayesian Adaptation of PLDA Based Speaker Recognition to Domains With Scarce Development Data", Odyssey 2012, Singapore. Can be found at : http://www.superlectures.com/odyssey2012/lecture?id=13.

W.M Campbell, "Compensating for Mismatch in High-Level Speaker Recognition", IEEE Odyssey 2006 The Speaker and Language Recognition Workshop, Jun. 2006, pp. 1-6.

* cited by examiner

DATASET SHIFT COMPENSATION IN MACHINE LEARNING

BACKGROUND

Present embodiments relate to the field of dataset shift in machine learning.

Dataset shift is a concept in machine learning in which the characteristics of the training data differ in some way from the characteristics of the test data. Dataset shift is present in many practical applications, for reasons ranging from the bias introduced by experimental design to the irreproducibility of the testing conditions at training time. Dataset shift often causes degradation in recognition and classification accuracy. Given that, it has received a growing amount of interest in the last few years.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for inter-dataset variability compensation, the method comprising using at least one hardware processor for: receiving a heterogeneous development dataset comprising multiple samples and metadata associated with at least some of the multiple samples; dividing the multiple samples into multiple homogenous subsets, based on the metadata; computing a statistical measure (e.g. average, mean, mode, total covariance matrix, within-class covariance matrix, and/or between-class covariance matrix) of high-level features of each of the multiple homogenous subsets, to produce multiple central high-level features for the multiple homogenous subsets, respectively; computing an inter-dataset variability subspace spanned by the multiple central high-level features; removing the inter-dataset variability subspace from the high-level features of the multiple homogenous subsets, to produce denoised samples; and training a machine learning system using the denoised speech samples.

In some embodiments, the high-level features are selected from the group consisting of: i-vectors, GMM (Gaussian Mixture Model) supervectors, HMM (Hidden Markov Model) supervectors, d-vectors, JFA (Joint Factor Analysis) supervectors, LBP (Local Binary Patterns), HOG (Histograms of Oriented Gradients), and EBIF (Early Biologically-Inspired Features).

In some embodiments, the machine learning system is selected from the group consisting of: a PLDA (Probabilistic Linear Discriminant Analysis)-based system, an SVM (Support Vector Machine)-based system, a neural network-based system, a NAP (Nuisance Attribute Projection)-based system, a WCCN (Within-Speaker Covariance Matrix)-based system, and an LDA (Linear Discriminant Analysis)-based system.

In some embodiments, the multiple samples are speech samples.

In some embodiments, the heterogeneous development dataset is devoid of speech samples from a target domain of the speaker recognition.

In some embodiments, the metadata comprises at least one parameter selected from the group consisting of: speaker gender, spoken language and recordation setting.

In some embodiments, the computing of the inter-dataset variability subspace comprises PCA (Principal Component Analysis).

There is further provided, in accordance with an embodiment, a method for inter-dataset variability compensation for speaker recognition, the method comprising using at least one hardware processor for: receiving a heterogeneous development dataset comprising multiple speech samples; dividing the multiple speech samples into multiple homogenous subsets; for each subset i of the multiple homogenous subsets: (a) estimating PLDA (Probabilistic Linear Discriminant Analysis) hyper-parameters $\{\mu_i, B_i, W_i\}$, wherein $\mu$ denotes a center of an i-vector space, B denotes a between-speaker covariance matrix and W denotes a within-speaker covariance matrix, and (b) computing an i-vector subspace $S_\mu$ corresponding to $\{\mu_i\}$, an i-vector subspace $S_W$ corresponding to $\{W_i\}$, and an i-vector subspace $S_B$ corresponding to $\{B_i\}$; joining i-vector subspaces $S_\mu$, $S_W$ and $S_B$ into a single subspace S; removing subspace S from i-vectors of the multiple speech samples, to produce denoised speech samples; and training a PLDA speaker recognition system using the denoised speech samples.

There is further provided, in accordance with an embodiment, a computer program product for inter-dataset variability compensation for speaker recognition, the computer program product comprising a non-transitory computer-readable storage medium having program code embodied therewith, the program code executable by at least one hardware processor to: receive a heterogeneous development dataset comprising multiple speech samples; divide the multiple speech samples into multiple homogenous subsets; for each subset i of the multiple homogenous subsets: (a) estimate PLDA (Probabilistic Linear Discriminant Analysis) hyper-parameters $\{\mu_i, B_i, W_i\}$, wherein $\mu$ denotes a center of an i-vector space, B denotes a between-speaker covariance matrix and W denotes a within-speaker covariance matrix, and (b) compute an i-vector subspace $S_\mu$ corresponding to $\{\mu_i\}$, an i-vector subspace $S_W$ corresponding to $\{W_i\}$, and an i-vector subspace $S_B$ corresponding to $\{B_i\}$; join i-vector subspaces $S_\mu$, $S_W$ and $S_B$ into a single subspace S; remove subspace S from i-vectors of the multiple speech samples, to produce denoised speech samples; and train a PLDA speaker recognition system using the denoised speech samples.

In some embodiments, the method further comprises smoothing B by linear interpolation using an estimated diagonal of B.

In some embodiments: the heterogeneous development dataset further comprises metadata associated with at least some of the multiple speech samples; and the dividing is based on the metadata.

In some embodiments, the computing of each of the i-vector subspaces and $S_B$ comprises PCA (Principal Component Analysis).

In some embodiments, the method further comprises computing an average of squared $\{W_i\}$, and finding a k number of largest eigenvalues of the squared $\{W_i\}$, wherein the k largest eigenvalues span the i-vector subspace $S_W$.

In some embodiments, the method further comprises whitening the i-vector subspace $S_W$ with respect to W.

In some embodiments, the method further comprises computing an average of squared $\{B_i\}$, and finding a k number of largest eigenvalues of the squared $\{B_i\}$, wherein the k largest eigenvalues span the i-vector subspace $S_B$.

In some embodiments, the method further comprises whitening the i-vector subspace $S_B$ with respect to B.

In some embodiments, the program code is further executable by the at least one hardware processor to smooth B by linear interpolation using an estimated diagonal of B.

In some embodiments, the program code is further executable by the at least one hardware processor to: compute an average of squared $\{W_i\}$; find a k number of largest eigenvalues of the squared $\{W_i\}$, wherein the k largest eigenvalues span the i-vector subspace $S_W$; whiten the i-vector subspace $S_W$ with respect to W; compute an average of squared $\{B_i\}$; find an m number of largest eigenvalues of the squared $\{B_i\}$, wherein the m largest eigenvalues span the i-vector subspace $S_b$; and whiten the i-vector subspace $S_B$ with respect to B.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
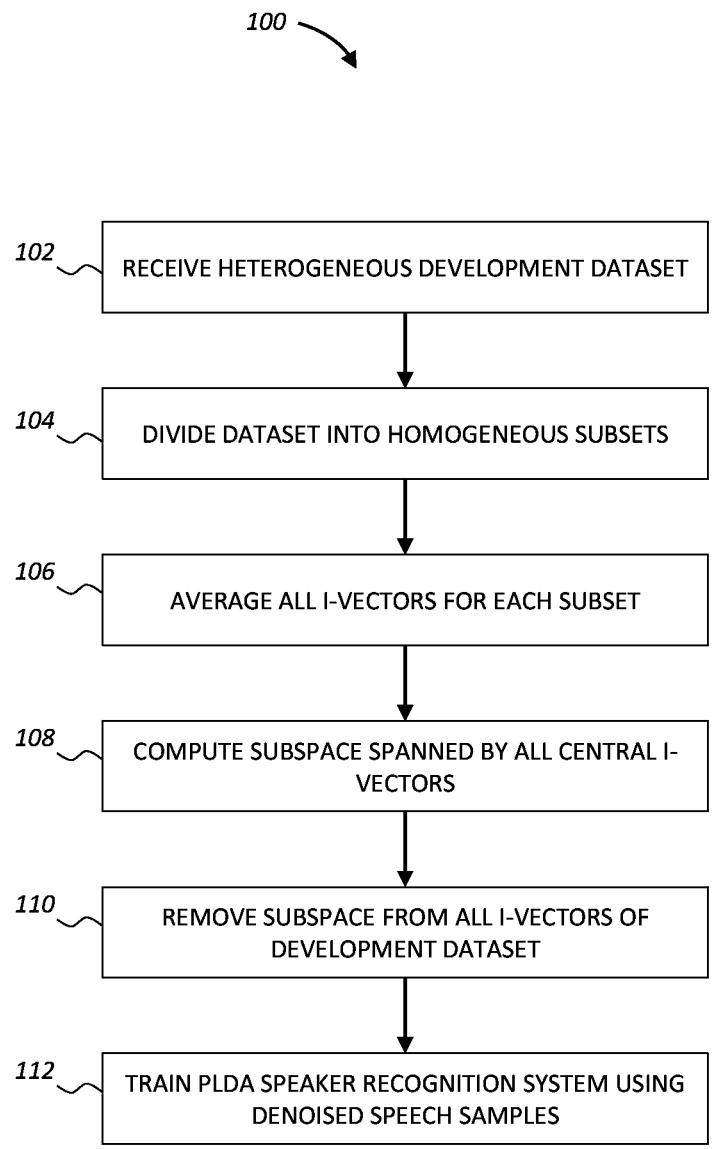
FIG. 1 shows a flow chart of a method for inter-dataset variability compensation (IDVC) for speaker recognition.

Inter-dataset variability compensation (IDVC) is disclosed herein, which may be advantageous for use with many different types of machine learning tasks. The present IDVC may be aimed at directly estimating and removing dataset shift in high-level features of a development dataset of the machine learning task, thereby greatly enhancing the accuracy of the machine learning results. Machine learning tasks which may benefit from the present IDVC include, for example, speaker verification, language recognition, emotion recognition, facial recognition, and many other biometric or similar recognition tasks.

For simplicity of discussion, the IDVC is discussed herein in the context of speaker recognition, in which the aim is to directly estimate and remove dataset shift in the high-level feature domain, thereby greatly enhancing speaker recognition accuracy. Dataset shift vectors may be estimated for subsets of development data (corresponding to different sources), and a low-dimensional subspace may then be estimated from these shift vectors. This estimation is based on the finding that, typically, it is only a certain number of directions in the high-level feature domain which are responsible for the majority of the dataset shift. The estimated low-subspace may be removed from all high-level features as a pre-processing step before machine training and/or scoring.

A high-level feature, as often defined in the field of machine learning, is a computed characteristic pertaining to a substantial portion of a sample under investigation, or even to the entirety of the sample. Namely, it is not a local feature exhibited only one of a few portions of a sample, but rather a more abstract feature descriptive of the sample. Examples of high-level features include:

i-vectors (also "ivectors"): the factor-analysis front-end approach to speaker verification which was proposed, inter alia, by N. Dehak, P. Kenny, R. Dehak, P. Dumouchel, and P. Ouellet, "Front-End Factor Analysis For Speaker Verification," in *IEEE Trans. on Audio, Speech and Language Processing*, vol. 19, no. 4, pp. 788-798, 2010.

GMM (Gaussian Mixture Model) supervectors: proposed, inter alia, by H. Aronowitz, H. Hoory, J. Pelecanos, D. Nahamoo, "New Developments in Voice Biometrics for User Authentication", in *Proc. Interspeech*, 2011.

HMM (Hidden Markov Model) supervectors: proposed, inter alia, by Aronowitz 2011 (ibid).

d-vectors (also "dvectors"): proposed, inter alia, by O. Barkan, H. Aronowitz, "Diffusion Maps for PLDA-based Speaker Verification", in *Proc. ICASSP,* 2013.

JFA (Joint Factor Analysis) supervectors: proposed, inter alia, by P. Kenny and P. Dumouchel, "Experiments in Speaker Verification using Factor Analysis Likelihood Ratios," in *Proceedings of Odyssey04—Speaker and Language Recognition Workshop*, Toledo, Spain, 2004.

LBP (Local Binary Patterns): proposed, inter alia, by N. Dalal, and B. Triggls. "Histograms of oriented gradients for human detection". In *Proc. of CVPR,* 2005.

HOG (Histograms of Oriented Gradients): proposed, inter alia, by T. Ahonen, A. Hadid, and M. Pietikainen. "Face recognition with local binary patterns". In *Proc. of European Conference on Computer Vision (ECCV)*, 2004.

EBIF (Early Biologically-Inspired Features): proposed, inter alia, by M. Li, S. Bao, W. Qian, Z. Su, and N. K. Ratha. "Face recognition using early biologically inspired features". in *Proc. of Biometrics: Theory, Applications and Systems (BTAS)*, 2013.

Those of skill in the art will recognize that the present IDVC method may be applicable to many more high-level features in the biometrics field and related fields. For simplicity of discussion, the following disclosure refers, as an example, to an implementation of IDVC using i-vectors in speaker verification.

As briefly discussed above, the removal of the estimated low-subspace from all high-level features serves as a pre-processing step before machine training and/or scoring. This machine training and/or scoring may be performed in a machine learning system, as known in the art, which utilizes one of different modeling techniques. Examples of such machine learning systems include:

A PLDA (Probabilistic Linear Discriminant Analysis)-based system, as known in the art.

An SVM (Support Vector Machine)-based system, as known in the art.

A neural network-based system, as known in the art.

A NAP (Nuisance Attribute Projection)-based system, as known in the art and disclosed, inter alia, by Solomonoff, Alex, Campbell, William M., and Quillen, Carl, "Nuisance Attribute Projection", in *Speech Communication*, Elsevier Science BV, Amsterdam, The Netherlands. 1 May 2007.

A WCCN (Within-Speaker Covariance Matrix)-based system, as known in the art and disclosed, inter alia, by Andrew O. Hatch, Sachin S. Kajarekar, Andreas Stolcke, "Within-class covariance normalization for SVM-based speaker recognition", in *Interspeech* 2006.

An LDA (Linear Discriminant Analysis)-based system, as known in the art.

Those of skill in the art will recognize that the present IDVC may be used in conjunction with other machine learning systems as well.

Further disclosed here is a generalization of the IDVC method, to compensate for inter-dataset variability attributed to additional PLDA hyper-parameters, namely the within and between speaker covariance matrices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

1. Inter-Dataset Variability Compensation

Reference is now made to FIG. 1, which shows a flow chart of a method 100 for inter-dataset variability compensation (IDVC) for speaker recognition.

In a step 102, a heterogeneous development dataset may be received. The development dataset may include multiple speech samples stored as digital audio files. The term "heterogeneous" refers to the fact that the speech samples vary with respect to multiple parameters of their source domains, such as speaker gender, speech type (e.g. telephone conversation, face-to-face interview, etc.), microphone type, background noise, and/or the like. The speech samples may be of different speakers (i.e. different people), wherein one or more speech samples may be provided per speaker.

In some embodiments, the development dataset is devoid of any speech samples from a target domain of the speaker recognition, or includes only low amount of such speech samples (e.g. 20% or less of the total number of samples). Namely, at least some of the aforementioned parameters of the source domains are vastly different than the parameters of the anticipated enrollment and/or test data of the intended speaker recognition.

The development dataset may further include metadata for at least some of the speech samples. The metadata may indicate, for example, parameters such as the gender of the speaker, the language spoken, the channel type (e.g. landline telephone, cellular telephone, VoIP call, etc.), conversation type (e.g. telephone conversation, face-to-face conversation, reading out loud a script, etc.) background noise level, length and/or the like.

In a step 104, the development dataset may be divided into multiple, homogenous subsets. The division may be performed based to the metadata included the development set. For example, the division may form homogenous subsets each including speech samples of a different gender, a different spoken language, etc.

In a step 106, for each of the multiple subsets, all i-vectors may be averaged, thereby producing a central i-vector for the entire subset. Averaging, however, is just one example of computing a statistical measure of all i-vectors. Other statistical measures may be computed, such as average, mean, mode, total covariance matrix, within-class covariance matrix, between-class covariance matrix, etc.

In a step 108, principal component analysis (PCA), as known in the art, may be used to computing a subspace spanned by all central i-vectors. This subspace is termed the "inter-dataset variability subspace", and is accountable for a majority, if not for the entirety, of the dataset shift. The dimension of the subspace may be determined in one of multiple methods. For example, it may be determined experimentally by testing different dimensions versus evaluation data (i.e. enrollment and verification speech samples), and choosing the most successful dimension. As another example, the eigengap, as known in the art, may be analyzed for the sorted eigenvalues resulting from the PCA. A sudden change in the eigengap may be used as an indication leading to the dimension of the subspace. Other methods may similarly be used for computing the dimension of the subspace.

In a step 110, the inter-dataset variability subspace may be removed from all the i-vectors of the speech samples of both the development and evaluation (i.e. enrollment and verification speech samples) datasets, to produce denoised speech samples.

In a step 112, the denoised speech samples, which may be referred to as pre-processed development data, may be used for training a PLDA speaker recognition system, as known in the art. Advantageously, the trained PLDA system does not suffer (or only minimally suffers) from the dataset shift problem in the i-vector domain, thereby greatly enhancing speaker recognition accuracy.

2. Compensation for Within and Between Speaker Covariance Matrices

Standard PLDA addresses two types of variability: between speaker variability and within-speaker variability. Gaussian PLDA, which is currently the state-of-the-art, assumes that both of these types of variability are multivariate Gaussian distributions.

For heterogeneous data, the Gaussian assumptions are inappropriate. Real life data is usually heterogeneous and may contain different channels (landline, cellular, microphone, etc.), different audio durations, different textual content (for text-dependent speaker verification), etc.

This calls for extending the IDVC discussed above to cope with dataset mismatch that is not purely an additive shift in i-vector space.

Figure 2:
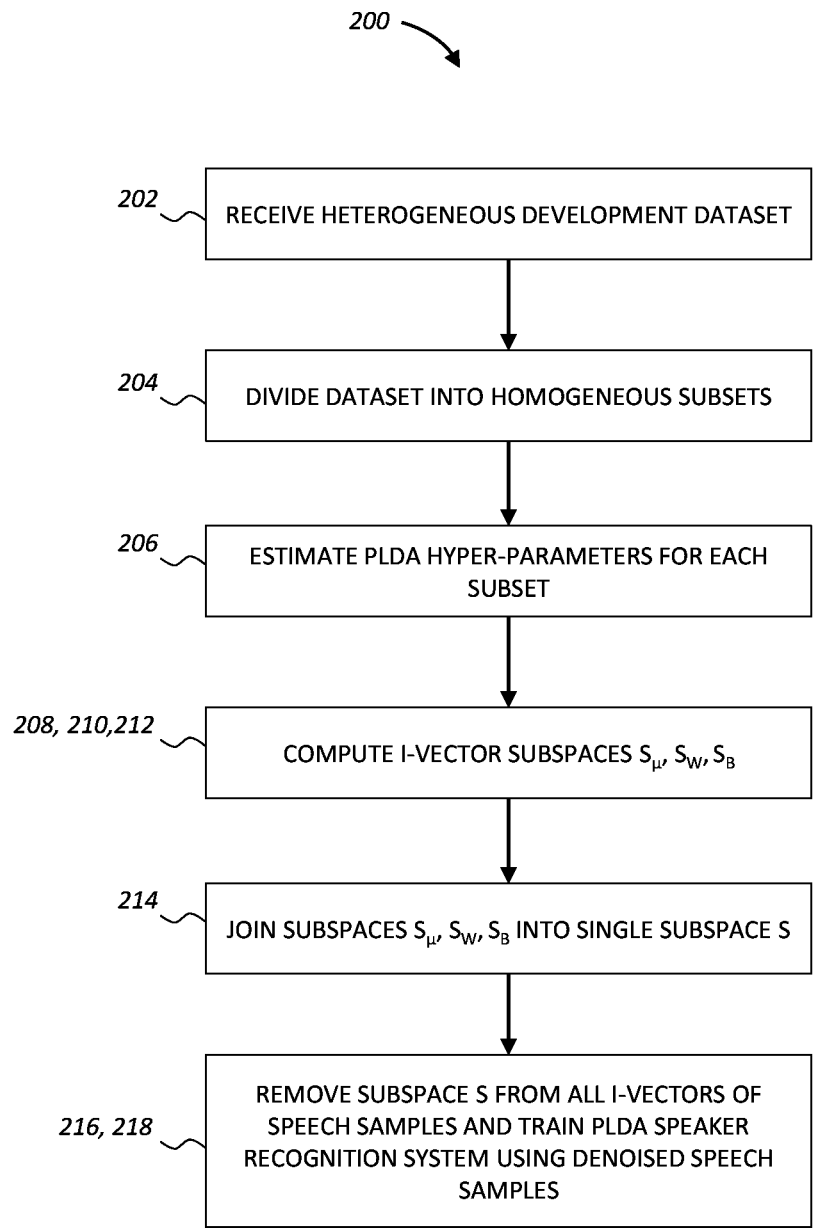
FIG. 2 shows a flow chart of a method for IDVC for speaker recognition, which method copes with dataset variability in additional hyper-parameters of the PLDA model.

Reference is now made to FIG. 2, which shows a flow chart of a method 200 for inter-dataset variability compensation (IDVC) for speaker recognition, which method copes with dataset variability in additional hyper-parameters of the PLDA model, namely the within speaker covariance matrix and the between speaker covariance matrix.

In a step 202, a heterogeneous development dataset may be provided. The development dataset may include multiple speech samples stored as digital audio files. The term "heterogeneous" refers to the fact that the speech samples vary with respect to multiple parameters of their source domains, such as speaker gender, speech type (e.g. telephone conversation, face-to-face interview, etc.), microphone type, background noise, and/or the like. The speech samples may be of different speakers (i.e. different people), wherein one or more speech samples may be provided per speaker.

In some embodiments, the development dataset is absent any speech samples from a target domain of the speaker recognition, or includes only low amount of such speech samples (e.g. 20% or less of the total number of samples). Namely, at least some of the aforementioned parameters of the source domains are vastly different than the parameters of the anticipated enrollment and/or test data of the intended speaker recognition.

In a step 204, the development dataset may be divided into multiple, homogenous subsets. The division may be performed according to the metadata included the development set. For example, the division may form homogenous subsets each including speech samples of a different gender, a different spoken language, etc. Alternatively, in the absence of metadata, the division may be performed by clustering the development dataset in order to automatically detect distinct homogenous subsets. The clustering may be done by standard techniques known in the art.

In a step 206, for each $i^{th}$ subset, PLDA hyper-parameters $\{\mu_i, B_i, W_i\}$ may be estimated. The PLDA framework assumes that the i-vectors distribute according to Equation (1):

$$\phi = \mu + s + c \qquad (1)$$

where $\phi$ denotes an i-vector, s denotes a speaker component, c denotes a channel (or within-speaker variability) component, and $\mu$ denotes the center of the i-vector space. Components s and c are assumed to distribute normally with zero mean and covariance matrices B (between speaker) and W (within-speaker), respectively. The PLDA model is thus parameterized by $\{\mu, B, W\}$ and the goal of PLDA training or adaptation algorithm is to estimate (or adapt) these hyper-parameters.

The estimation of step 206 may be performed, for example, using the method in S. J. D. Prince, "Probabilistic linear discriminant analysis for inferences about identity", in *Proc. International Conference on Computer Vision (ICCV)*, 2007.

Optionally, the estimation of the B matrix is smoothed by linearly interpolating with its estimated diagonal, giving the diagonal a weight of, for example, 0.1. Similarly, the estimation of the W matrix is also smoothed.

The following steps 208-212 may be performed in any order, or even simultaneously.

In a step 208, an i-vector subspace $S_\mu$ corresponding to the set may be computed, for example using PCA.

In a step 210, an i-vector subspace $S_W$ corresponding to the set $\{W_i\}$ may be computed, for example using PCA. For a set of n covariance matrices $\{W_i\}$ the mean of the set is denoted by W. The following sub-steps may be used for computing subspace $S_W$:

In a sub-step 210a, the i-vector space may be whitened with respect to matrix W by applying $W_i \rightarrow TW_iT^t$ with $TT^t = W^{-1}$. The whitening may be aimed at finding the optimal subspace, and may include applying a linear transform to the i-vector space, after which the covariance is the identity matrix (I).

In a sub-step 210b, $$\Omega = \frac{1}{n}\sum W_i^2$$

may be computed, wherein Omega is the average of squared covariance matrices $W_i$, required for finding the subspace.

In a sub-step 210c, the k largest eigenvalues of $\Omega$ may be found. The corresponding eigenvectors span subspace $S_W$.

In a step 212, an i-vector subspace $S_B$ corresponding to the set $\{B_i\}$ may be computed, for example using PCA. For a set of n covariance matrices $\{B_i\}$ the mean of the set is denoted by B. The following sub-steps may be used for computing subspace $S_B$:

In a sub-step 212a, the i-vector space may be whitened with respect to matrix B by applying $B_i \rightarrow TB_iT^t$ with $TT^t = B^{-1}$.

In a sub-step 212b, $$\Omega = \frac{1}{n}\sum B_i^2$$

may be computed.

In a sub-step 212c, the m largest eigenvalues of $\Omega$ may be found. The corresponding eigenvectors span subspace $S_B$.

The motivation behind steps 210-212 is that after whitening with the mean within covariance W or B, the within-speaker variance along every axis equals to one for the whitened mean within covariance W or B. For whitened covariance matrix $W_i$ or $B_i$, the variance along an axis defined by unit vector v equals to $v^tW_iv$ or $v^tB_iv$, respectively. The quantity chosen here to be maximized is the variance of the variances along the axis. This is formulated in Equation (2) for covariance W and Equation (3) for covariance B:

$$v^* = \text{argmaxvar}(v^tW_iv) \quad (2)$$
$$= \text{argmax}\left\{\frac{1}{n}\sum_i (v^tW_iv)^2 - 1\right\}$$
$$= \text{argmax}v^t\left(\frac{1}{n}\sum_i W_i^2\right)v$$

$$v^* = \text{argmaxvar}(v^tB_iv) \quad (3)$$
$$= \text{argmax}\left\{\frac{1}{n}\sum_i (v^tB_iv)^2 - 1\right\}$$
$$= \text{argmax}v^t\left(\frac{1}{n}\sum_i B_i^2\right)v$$

The solution for Equation (2) is the first eigenvector of matrix $$\frac{1}{n}\sum_i W_i^2;$$

similarly, the solution for Equation (3) is the first eigenvector of matrix $$\frac{1}{n}\sum_i B_i^2.$$

In a step 214, subspaces $S_\mu$, $S_W$ and $S_B$ may be joined, to form a single subspace $S = S_\mu \cup S_W \cup S_B$.

In a step 216, subspace S may be removed from all the i-vectors of the speech samples of the development dataset, to produce denoised speech samples. Then, the denoised speech samples, which may be referred to as pre-processed development data, may be used for training a PLDA speaker recognition system, as known in the art.

In a step 218, subspace S may be removed from all the i-vectors of the speech samples of the evaluation dataset, to produce denoised speech samples. Then, the denoised speech samples, which may be referred to as pre-processed evaluation data, may be used for scoring in a PLDA speaker recognition system, as known in the art.

The scoring may include comparing a test utterance of a certain speaker (or multiple ones) with the enrollment data of that speaker. The result of this comparison is indicative of the success of the PLDA speaker recognition system.

It should be noted that estimation of IDVC for the W and B hyper-parameters requires the availability of metadata (also referred to as "speaker labels"). However, a common use case for IDVC would be when labeled data is available for PLDA training from one source only, and the multi-source data available for IDVC training is unlabeled. In this case, IDVC may be applied on the $\mu$ hyper-parameter and on the total covariance matrix denoted by T which is the covariance of the i-vectors distribution.

EXPERIMENTAL RESULTS

1. Experimental Results of Inter-Dataset Variability Compensation

The example below is arranged in accordance with the official experimental setup of the Johns Hopkins University (JHU) 2013 speaker recognition workshop. Following is a description of the datasets used, the speaker recognition system baseline, and the experimental protocol.

1.1. The SWB Dataset

The SWB dataset, provided at the JHU 2013 speaker recognition workshop, consists of all telephone calls taken from corpora of two telephone switchboards. This dataset serves as the mismatched (namely, dataset-shifted) development dataset. The dataset consists of 3114 speakers and 33039 sessions. For score normalization, 2000 male sessions and 2000 female sessions were randomly selected.

1.2. The MIXER Dataset

The MIXER dataset, provided at the JHU 2013 speaker recognition workshop, consists of a subset of telephone calls taken from speaker recognition evaluations (SREs) conducted by NIST (National Institute of Standards and Technology) in 2004-2008. For SRE 2008, interview data only was selected. This dataset serves as the matched development dataset. The dataset consists of 3790 speakers and 36470 sessions. For score normalization, 2000 male sessions and 2000 female sessions were randomly selected.

1.3. The NIST-2010 Dataset

The NIST 2010 SRE condition 2 core extended trial list (single telephone conversations for both test and train with normal vocal effort) was used for evaluation. This dataset consists of 7169 target trials and 408956 impostor trials.

1.4. I-Vector Extractor

The i-vectors used in this experiment were created by the organizers of the JHU 2013 speaker recognition workshop for the common use of the participants. A detailed description of the i-vector extractor is given in D. Garcia-Romero and A. McCree, "Supervised domain adaptation for i-Vector based speaker recognition", ICASSP 2014.

The i-vector extractor uses 40-dimensional Mel-frequency cepstral coefficients (MFCCs) (20 base+deltas) with short-time mean and variance normalization. It uses a 2048 mixture gender independent (GI) universal background model (UBM) to obtain 600 dimensional GI i-vectors. The UBM and i-vector extractor were trained using the whole SWB dataset.

1.5. I-Vector Centering

A common technique for i-vector-based systems is to center the i-vectors of given datasets to a common center. In the present experiment, the center of the development data was computed and used to center both the development and evaluation data.

1.6. PLDA Based Back End

Prior to PLDA modeling (see D. Garcia-Romero and C. Y. Espy-Wilson, "Analysis of i-vector length normalization in speaker recognition systems," in Proc. Interspeech 2011), the dimensionality of the i-vectors was reduced using GI-LDA (Gender-Indifferent Linear Discriminant Analysis) to 400. The next steps are within class covariance normalization (WCCN) and length normalization (Garcia-Romero, ibid.). Standard gender-dependent (GD) PLDA was then used with full between and within covariance matrices. Finally, ZT-norm (Z-normalization followed by T-normalization) for score normalization (which was found in the experiment to outperform S-norm) was optionally performed.

1.7. The Domain Robustness Task

In the domain robustness task, SWB was used for system building and NIST-2010 is used for evaluation. No use of MIXER (not even for i-vector centering) is allowed whatsoever.

1.8. The Domain Unsupervised Normalization Task

In the domain unsupervised normalization task, SWB was used for system building. Unlabeled MIXER was used for normalization, and NIST-2010 SRE was used for evaluation. Contrary to the domain adaptation challenge, in which the MIXER data is assumed to contain many multi-session speakers, no such assumption is made in the normalization task. The normalization step may be followed by a domain adaptation step (involving clustering of the data into speakers and retraining the PLDA system as done extensively by other JHU 2013 participants).

1.9. Evaluation Measures

Results of the experiment are reported by pooling male and female trials, but also by reporting separate male and female results. Three error measures are used: equal error rate (EER), minDCF (old) and minDCF (new)—as specified in NIST 2010 SRE evaluation plan, available online: http://www.nist.gov/itl/iad/mig/upload/NIST_SRE10_evalplan-r6.pdf. Last reviewed Jun. 27, 2014.

Table 1 shows SWB which was divided into 12 subsets (6 per gender) during the experiment. The subsets were defined according to the different LDC distributions (Table 3).

TABLE 1

SWB is partitioned into 6 subsets. Each subset is then partitioned into two GD subsets.

| Code | Description |
| --- | --- |
| 97S62 | SWB-1 Release 2 |
| 98S75 | SWB-2 Phase I |
| 99S79 | SWB-2 Phase II |
| 2001S13 | SWB Cellular Part 1 |
| 2002S06 | SWB-2 Phase III |
| 2004S07 | SWB Cellular Part 2 |

Table 2 reports the results using IDVC for a PLDA system built on SWB only (named the domain robustness task). Results are without score normalization. The whole subspace spanned by the 12 centers was used for IDVC removal. A 54% reduction in EER for pooled male and female trials was observed. Note that the improvement for females (59%) is larger than for males (48%). For minDCF (old) cost reduction is 41% in average. For minDCF (new), cost reduction is 22% in average.

TABLE 2

Results using IDVC with a PLDA system built on SWB (without score normalization).

| Evaluation dataset | IDVC training dataset | EER (in %) | minDCF (old) | minDCF (new) |
| --- | --- | --- | --- | --- |
| All | — | 8.20 | 0.325 | 0.687 |
|  | SWB | 3.75 | 0.192 | 0.533 |
| Males | — | 6.55 | 0.299 | 0.640 |
|  | SWB | 3.43 | 0.165 | 0.462 |
| Females | — | 9.75 | 0.342 | 0.706 |
|  | SWB | 4.00 | 0.210 | 0.581 |

Table 3 reports the investigation of the use of IDVC when the unlabeled MIXER data is available for unsupervised normalization. This task is named the domain unsupervised normalization task. The term normalization is used and not adaptation, in order to emphasize the lack of an assumption that the MIXER data contains multi-session speakers and the lack of use of clustering techniques. The MIXER data was used jointly with SWB to estimate the IDVC subspace. The whole subspace spanned by the 20 centers (12 SWB+8 MIXER) was used for IDVC removal.

Also explored was the possibility of using the MIXER data for score normalization, which was found in H. Aronowitz, "PLDA-based speaker recognition in a mismatched domain", ICASSP 2014 to be beneficial for the domain adaptation challenge. It was observed that using MIXER jointly with SWB for IDVC estimation gives a small improvement. Also observed was the fact that score normalization gives a large improvement for the baseline system, but only small improvements (if any) in conjunction with IDVC.

TABLE 3

Results on pooled male and female trials using IDVC with a PLDA system built on SWB. The use of MIXER for score normalization is explored.

| IDVC training dataset | Score normalization | EER (in %) | minDCF (old) | minDCF (new) |
|---|---|---|---|---|
| — | — | 8.20 | 0.325 | 0.687 |
| SWB | | 3.75 | 0.192 | 0.533 |
| SWB + MIXER | | 3.48 | 0.169 | 0.520 |
| — | MIXER | 5.87 | 0.227 | 0.715 |
| SWB | | 3.53 | 0.170 | 0.521 |
| SWB + MIXER | | 3.42 | 0.165 | 0.541 |

Next, the IDVC method was compared to other techniques in the framework of the domain robustness task (Table 4) and the framework of the domain unsupervised normalization task (Table 5).

TABLE 4

Results for the domain robustness task. IDVC outperforms all other methods.

| System | EER (in %) | minDCF (old) | minDCF (new) |
|---|---|---|---|
| Baseline | 8.20 | 0.325 | 0.687 |
| TVSR | 7.42 | 0.301 | 0.669 |
| SN | 5.33 | 0.254 | 0.640 |
| IDVC | 3.75 | 0.192 | 0.533 |

TABLE 5

Results for the domain unsupervised normalization task. IDVC outperforms all other methods.

| System | EER (in %) | minDCF (old) | minDCF (new) |
|---|---|---|---|
| Baseline | 8.20 | 0.325 | 0.687 |
| Centering and score normalization using MIXER | 5.84 | 0.223 | 0.631 |
| SN | 4.73 | 0.206 | 0.581 |
| TVSR | 4.05 | 0.176 | 0.549 |
| IDVC | 3.48 | 0.169 | 0.520 |

Finally, the results of using IDVC when training the system on the labeled MIXER are reported. As can see in Table 6, IDVC slightly degrades performance for the matched domain task.

TABLE 6

Results on pooled male and female trials using IDVC on a PLDA system built on MIXER.

| IDVC training dataset | EER (in %) | minDCF (old) | minDCF (new) |
|---|---|---|---|
| — | 2.41 | 0.119 | 0.374 |
| SWB | 2.45 | 0.122 | 0.403 |
| SWB + MIXER | 2.60 | 0.125 | 0.395 |

Figure 3:
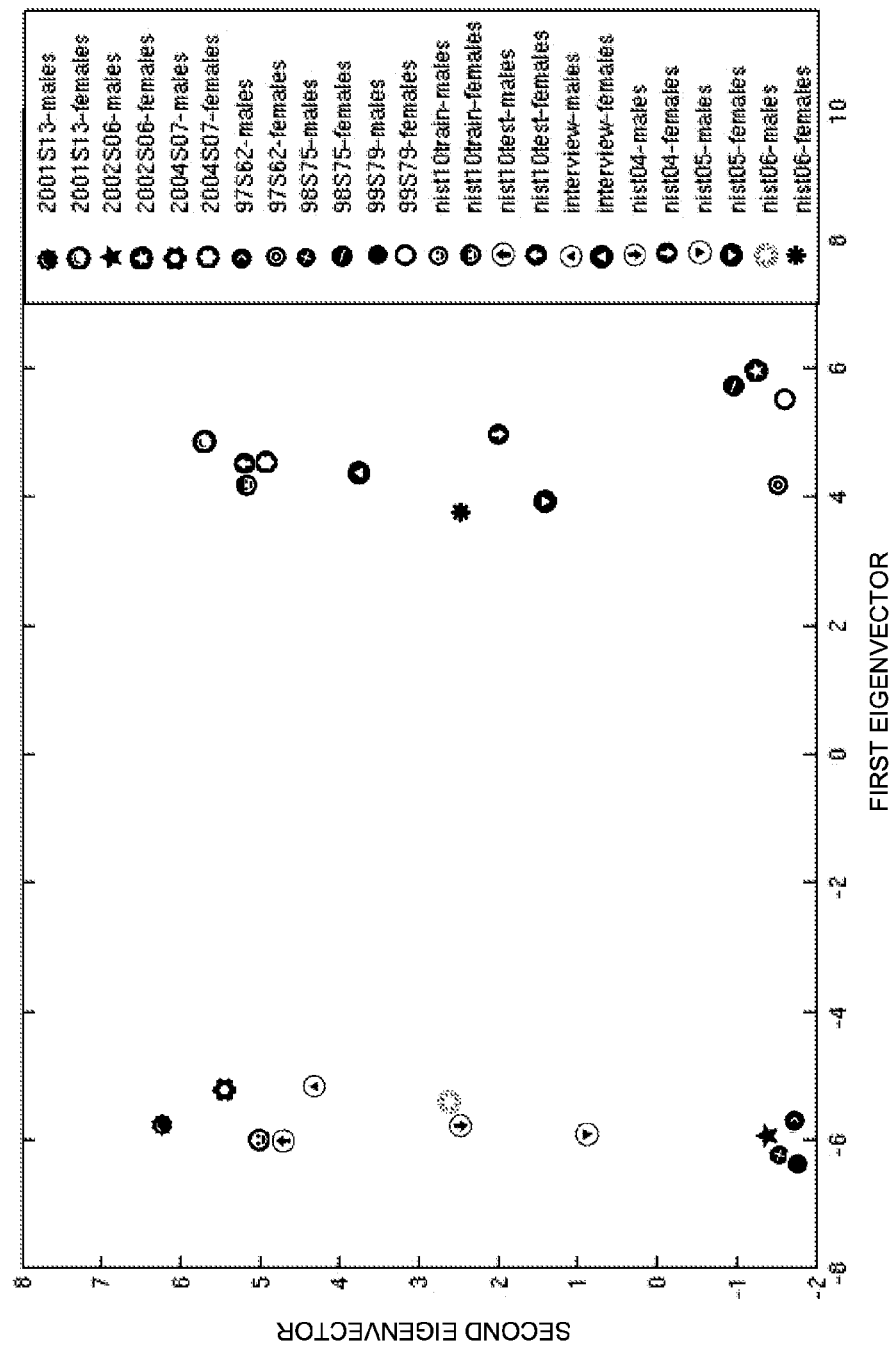
FIG. 3 shows the first two of four dimensions of projected subset centers.
Figure 4:
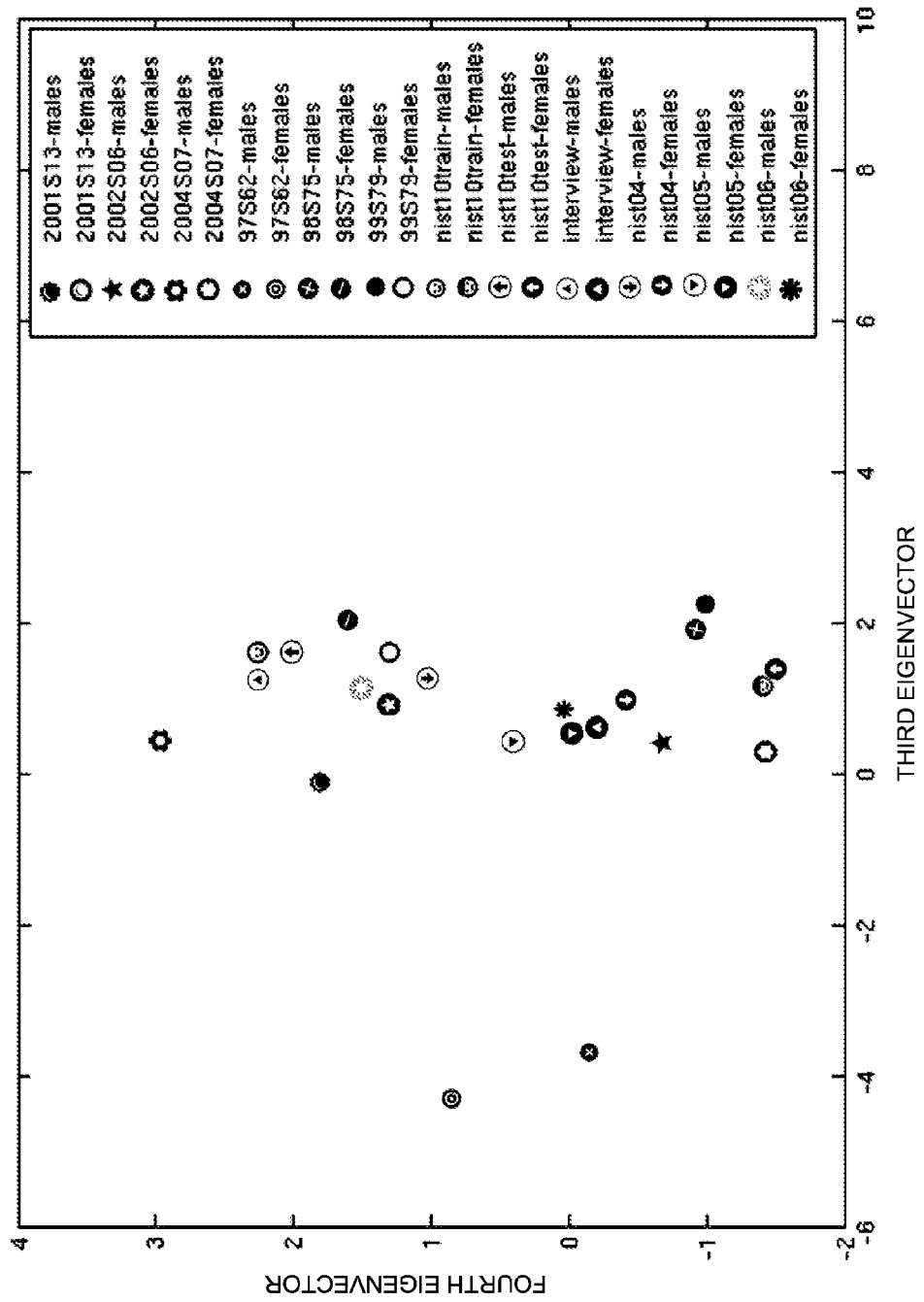
FIG. 4 shows the last two of four dimensions of the projected subset centers.

FIGS. 3 and 4 show the first four dimensions (FIG. 3 shows two of the dimensions and FIG. 4 the other two) of the projected centers of the subsets of SWB, MIXER and NIST-2010 in the dataset shift subspace. Note that the first eigenvector corresponds to gender.

In conclusion, IDVC has shown to effectively reduce the influence of dataset shift on the investigated i-vector PLDA system in the context of a domain adaptation challenge. When evaluated on a system trained on the Switchboard corpus, EER was decreased by 54%, DCF (old) by 41% and DCF (new) by 22%. When unlabeled MIXER data is used for adaptation, some additional gains are achieved.

2. Experimental Results of Compensation for within and Between Speaker Covariance Matrices Similar to experiment no. 1 above, the example below is arranged in accordance with the official experimental setup of the Johns Hopkins University (JHU) 2013 speaker recognition workshop. The datasets used, the speaker recognition system baseline, and the experimental protocol are the same as described above.

2.1. Baseline Results

The effect of dataset mismatch is illustrated in Table 7, which shows the degradation due to using mismatched data for estimating the PLDA hyper-parameters. The degradation due to mismatch in estimating $\mu$ is up to 50% relative when B and W are estimated on SWB. The degradation due to mismatch in estimating B and W is up to a factor of 3 when $\mu$ is mismatched and a factor of 2 when $\mu$ is matched.

TABLE 7

The effect of dataset mismatch for estimating PLDA hyper-parameters. Results are for pooled male and female trials. NIST-10 training data was used to center the training i-vectors, and NIST-10 test data was used to center the test i-vectors.

| W and B | $\mu$ | EER (in %) | minDCF (old) | minDCF (new) |
|---|---|---|---|---|
| SWB | SWB | 8.20 | 0.325 | 0.687 |
| | MIXER | 7.03 | 0.297 | 0.676 |
| | NIST-10 training data | 4.58 | 0.218 | 0.606 |
| | NIST-10 | 3.96 | 0.189 | 0.546 |
| MIXER | MIXER | 2.41 | 0.119 | 0.374 |
| | NIST-10 training data | 2.30 | 0.110 | 0.345 |
| | NIST-10 | 2.27 | 0.110 | 0.346 |

2.2. IDVC Applied to the $\mu$ Hyper-Parameter

Figure 5A:
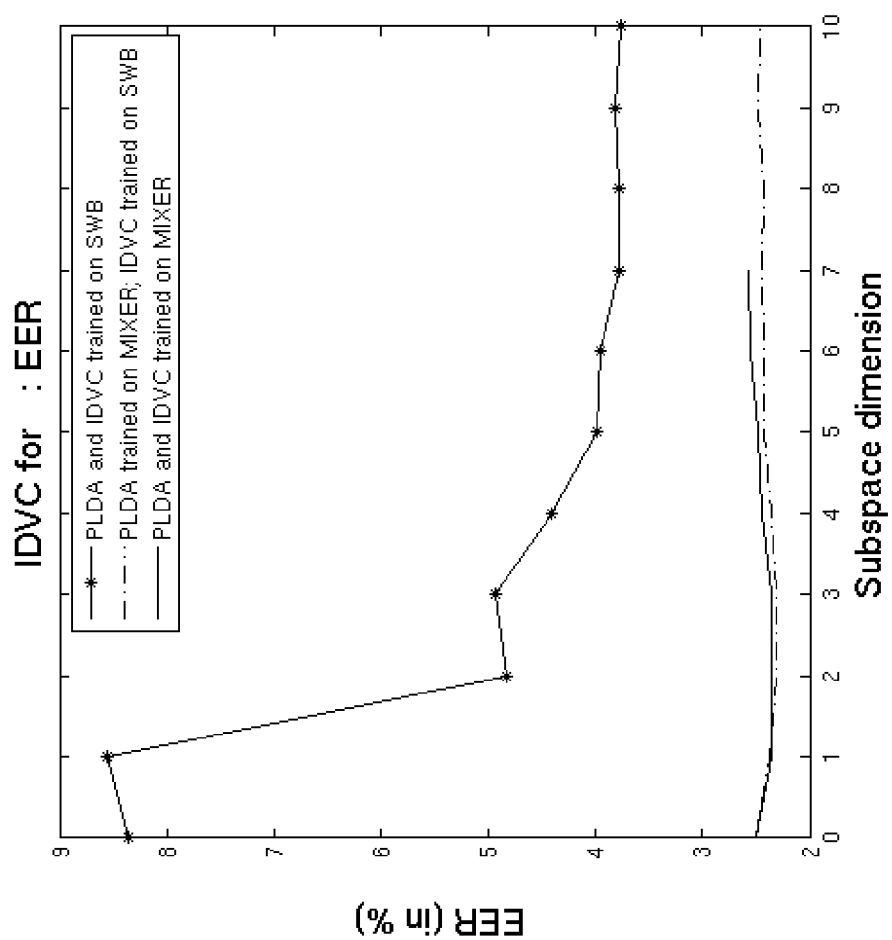
FIGS. 5A-C show the effect of IDVC applied to the µ hyper-parameter of the PLDA model.
Figure 5B:
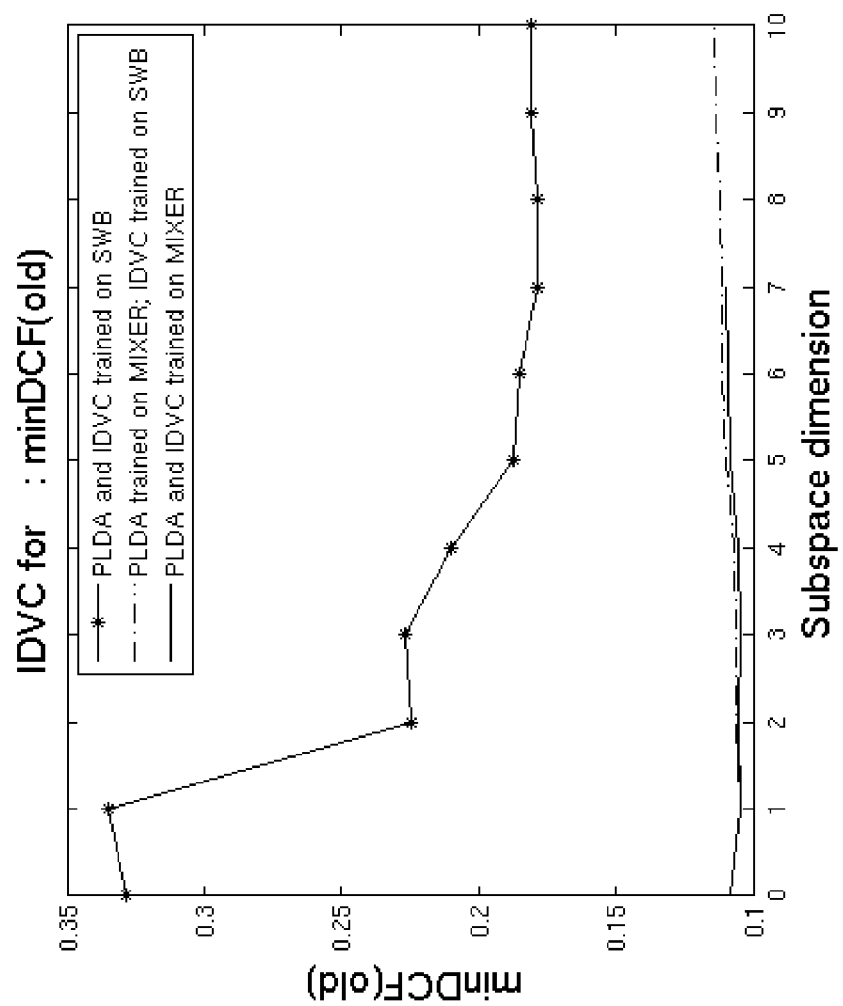
Figure 5C:
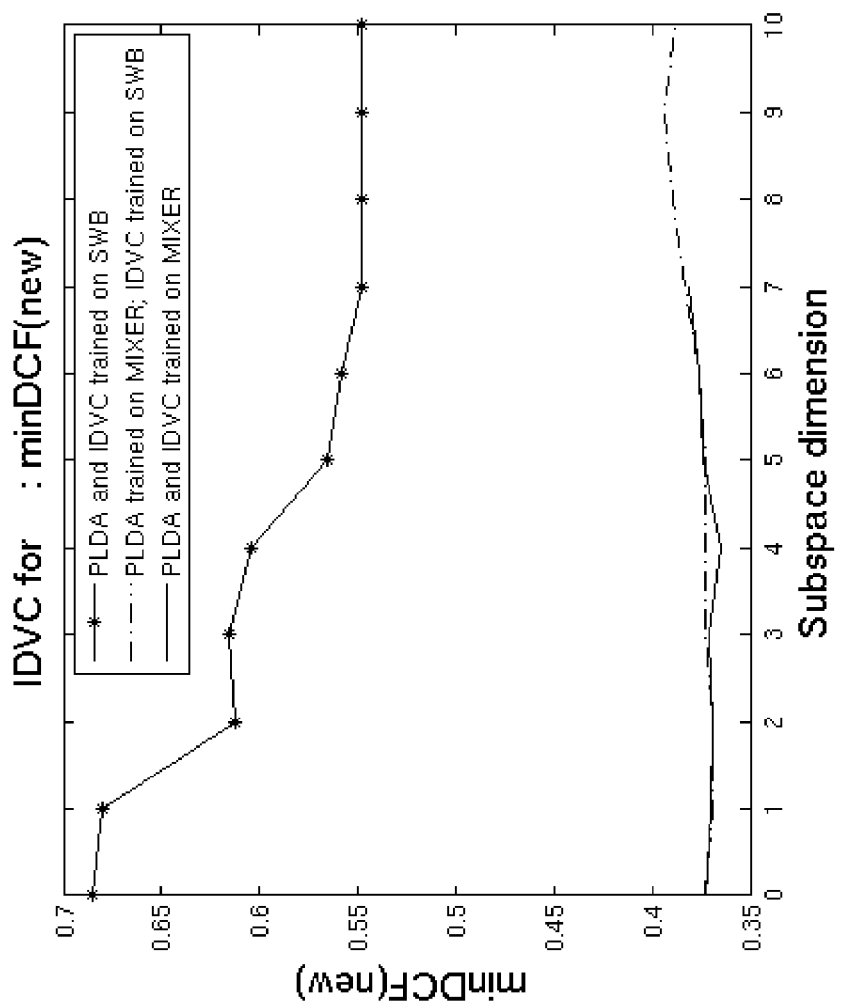

The effect of IDVC applied to the $\mu$ hyper-parameter is shown in FIGS. 5A-C. The main setup investigated is using SWB for parameter estimation (PLDA and IDVC). Furthermore, it was examined how a MIXER-based PLDA system is affected by IDVC estimated either from SWB or from MIXER itself.

The results for the SWB setup indicate ~50% relative reduction in EER and minDCF(old), and a very significant reduction in minDCF(new). The optimal subspace dimension is the maximal possible (which is limited by the number of subsets of datasets used to estimate the IDVC subspace).

For the MIXER setups, no significant change in accuracy is observed for dimensions lower than 5. Starting from a dimension of 5, a slight degradation is observed. This degradation may be explained by the fact that dataset shift is not very severe for MIXER. On the other hand, some speaker discriminative information evidently resides in the removed subspace. Selected results are reported in Table 8.

TABLE 8

Selected results for IDVC applied on the hyper-parameters
μ, B and W. Training of PLDA and IDVC is on SWB.
The first three columns list subspace dimension.

| μ | W | B | EER (in %) | minDCF (old) | minDCF (new) |
|---|---|---|---|---|---|
| 0 | 0 | 0 | 8.20 * | 0.325 | 0.687 |
| 10 | 0 | 0 | 3.75 ** | 0.192 | 0.533 |
| 0 | 100 | 0 | 3.37 | 0.155 | 0.496 |
| 0 | 0 | 100 | 3.53 | 0.164 | 0.510 |
| 10 | 50 | 0 | 3.09 | 0.138 | 0.454 |
| 10 | 0 | 50 | 3.39 | 0.154 | 0.469 |
| 10 | 30 | 30 | 3.15 | 0.138 | 0.463 |

(* Baseline results without using IDVC;
** Results from Table 2 above.)

2.3. IDVC Applied Independently for the W and B Hyper-Parameters

Figure 6A:
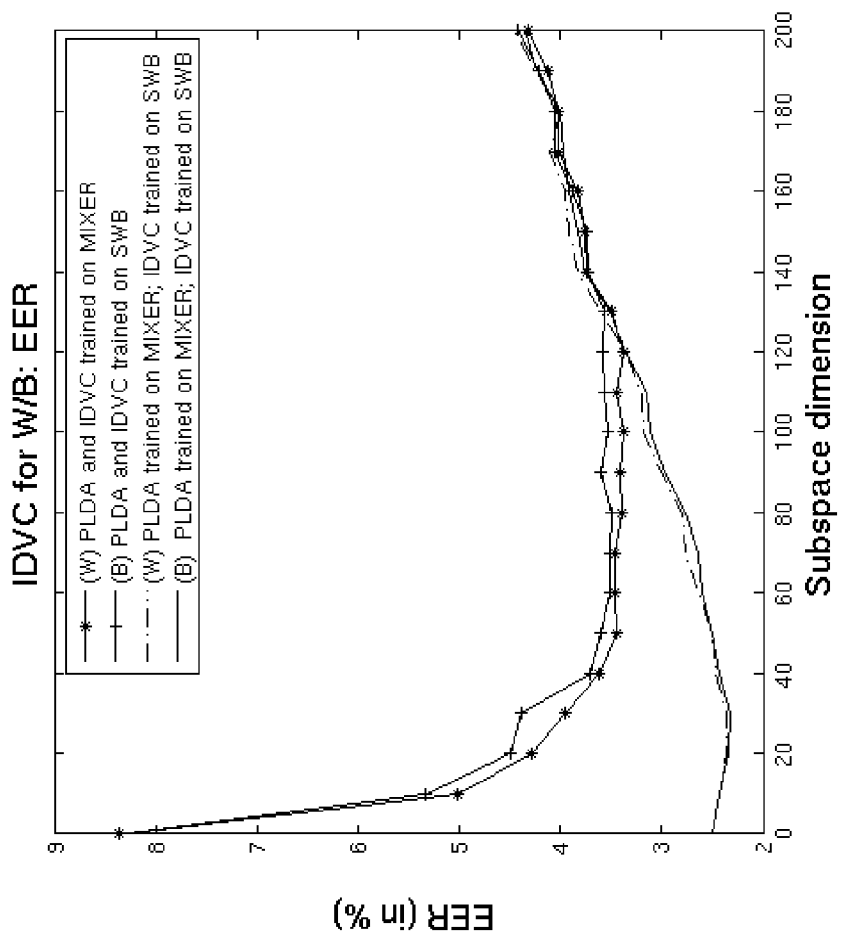
FIGS. 6A-C show the effect of IDVC applied independently for the W and B hyper-parameters of the PLDA model.
Figure 6B:
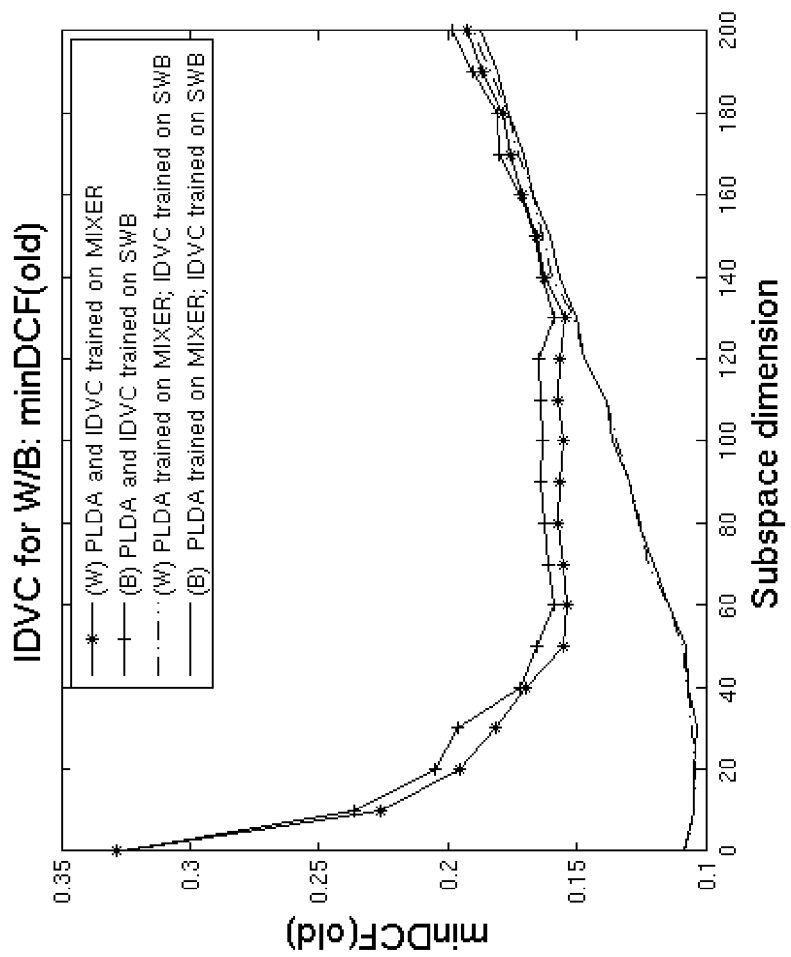
Figure 6C:
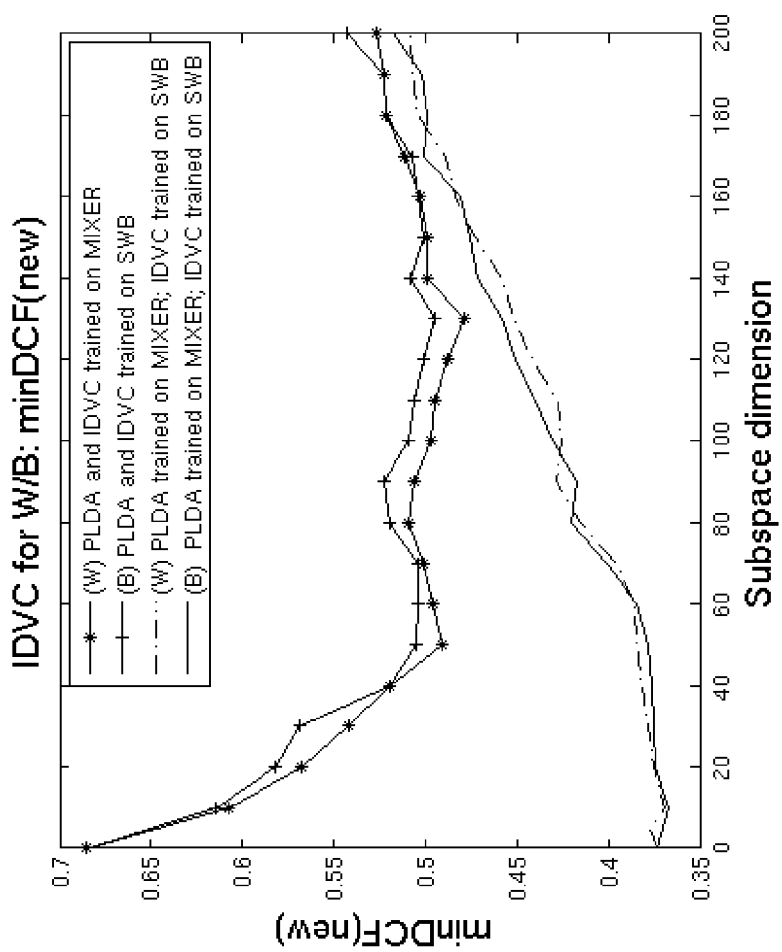

The effects of IDVC applied independently for the W and B hyper-parameters are shown in FIGS. 6A-C. As for μ, the main setup investigated is using SWB for parameter estimation (PLDA and IDVC). Furthermore, it was examined how a MIXER-based PLDA system is affected by IDVC estimated from SWB.

The results indicate quite similar results for applying IDVC for both the W and B hyper-parameters. The results for the SWB setup indicate even larger accuracy improvements compared to those achieved for the μ hyper-parameter. These good results are obtained for a subspace dimension in the range of 50-150.

For the MIXER setups, no significant change in accuracy is observed for a subspace dimension lower than 50. For higher dimensions, significant degradation is observed. This degradation indicates that the eigenvectors corresponding to dimensions higher than 50 contain speaker discriminative information. Selected results are reported in Table 8 above.

2.4. IDVC Applied Jointly for the μ, W and B Hyper-Parameters

Figure 7A:
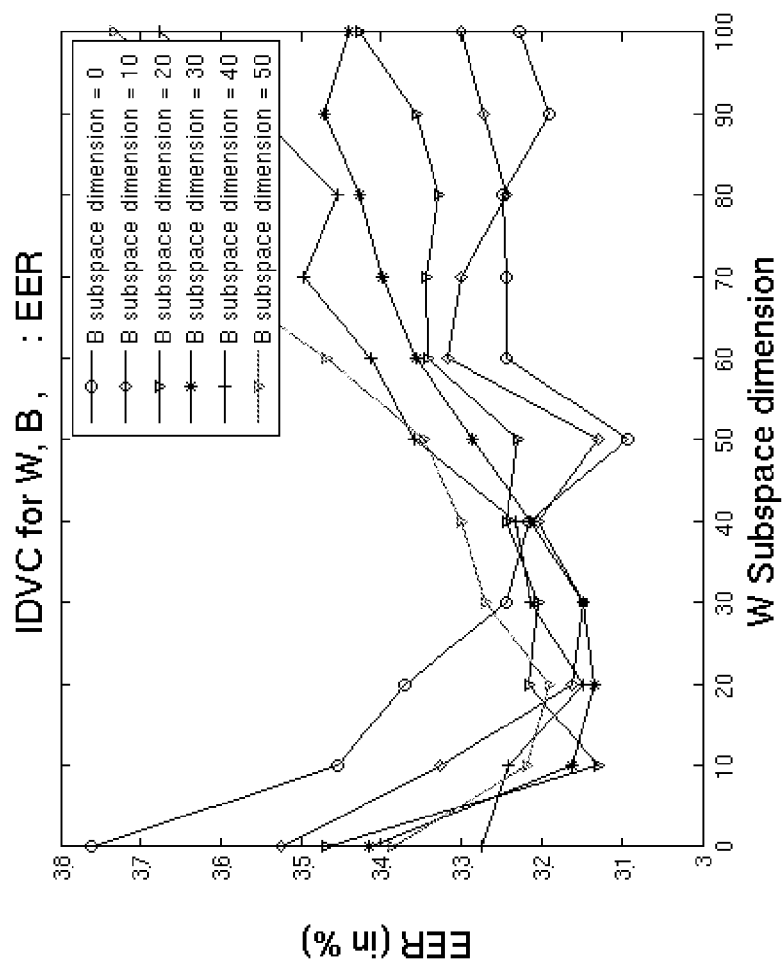
FIGS. 7A-C show the effect of IDVC applied jointly for the µ, W and B hyper-parameters of the PLDA model.
Figure 7B:
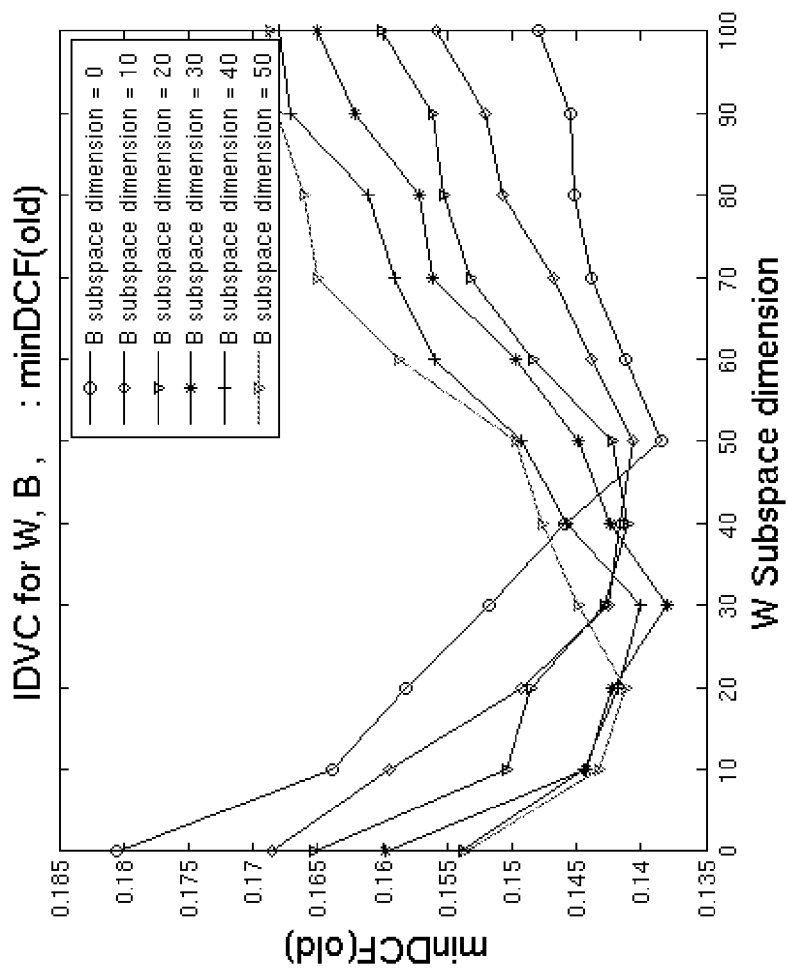
Figure 7C:
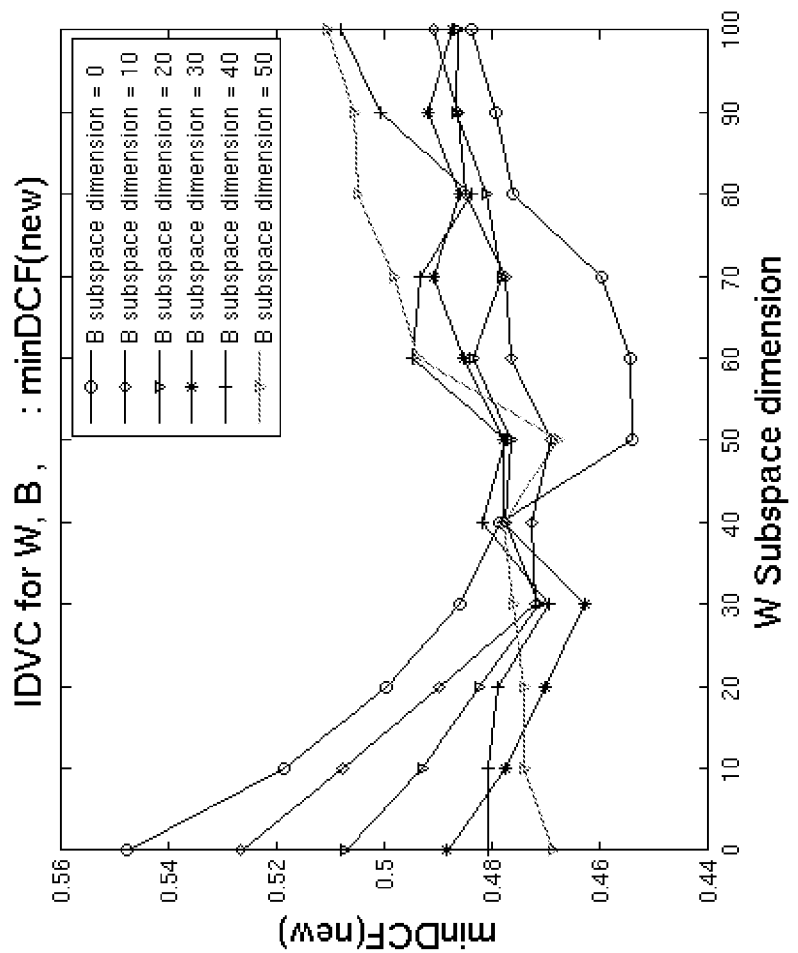

The effect of IDVC applied jointly for the μ, W and B hyper-parameters is shown in FIGS. 7A-C. The dimension for the μ subspace was 10. The setup of using SWB for parameter estimation (PLDA and IDVC) was investigated.

The results show that additional reduction in error can be obtained by applying IDVC on all three hyper-parameters. Selected results are reported in Table 8 above.

2.5. Exploring Different Data Partitions for IDVC Training

The experiments reported in sections 2.2-2.4 above were made using a partition of SWB into 12 subsets, following experiment no. 1. Here, the sensitivity of the IDVC algorithm to other partitions which may represent other useful setups is investigated.

The partition used so far is denoted by GD-12. Two additional partitions were considered. First, a gender independent version of GD-12, denoted by GI-6, was created.

Second, two subsets (SWB Cellular Part 2 and SWB-1 Release 2) were selected from GI-6, and a partition containing these two subsets only was created. This partition is denoted by GI-2. Selected experiments of training IDVC on the two new partitions were repeated.

Table 9 reports the results for IDVC training on the three different partitions. For μ-based IDVC, the full partition GD-12 is better than GI-6 and clearly outperforms GI-2. However, for IDVC applied on the hyper-parameters sets {μ, W} and {μ, W, B} the differences in accuracy between the partitions are quite small. These results indicate that IDVC was able to successfully estimate the IDVC subspace from two data subsets only.

TABLE 9

Selected results for IDVC applied on the hyper-parameters
μ, B and W. Training of PLDA and IDVC is on SWB. Three
different partitions for IDVC training are evaluated.

| Partition | μ | W | B | EER (in %) | minDCF (old) | minDCF (new) |
|---|---|---|---|---|---|---|
| Baseline | 0 | 0 | 0 | 8.20 | 0.325 | 0.687 |
| GD-12 | 10 | 0 | 0 | 3.75 | 0.192 | 0.533 |
| GI-6 | 5 | 0 | 0 | 4.22 | 0.197 | 0.562 |
| GI-2 | 1 | 0 | 0 | 5.28 | 0.231 | 0.612 |
| GD-12 | 10 | 50 | 0 | 3.09 | 0.138 | 0.454 |
| GI-6 | 5 | 50 | 0 | 3.05 | 0.141 | 0.450 |
| GI-2 | 1 | 50 | 0 | 3.38 | 0.154 | 0.487 |
| GD-12 | 10 | 30 | 30 | 3.15 | 0.138 | 0.463 |
| GI-6 | 5 | 30 | 30 | 3.00 | 0.138 | 0.466 |
| GI-2 | 1 | 30 | 30 | 3.30 | 0.152 | 0.494 |

2.6. IDVC Applied without Speaker Labels

When speaker labels are unavailable, IDVC may be applied for the μ and T hyper-parameters. Table 10 reports results for SWB training (PLDA and IDVC) on the GI-2 partition. Comparison of Tables 9 and 10 shows that replacing B and W with T results in comparable error rates.

TABLE 10

Selected results for IDVC applied on the hyper-parameters μ,
and T on the GI-2 partition. Training of PLDA and IDVC is on SWB.

| μ | T | EER (in %) | minDCF (old) | minDCF (new) |
|---|---|---|---|---|
| 1 | 0 | 5.28 | 0.231 | 0.612 |
| 1 | 25 | 3.49 | 0.146 | 0.477 |

In conclusion, IDVC can be extended to capture variability in the hyper-parameters of the PLDA model, namely the center μ, the within-speaker covariance matrix W, and the between speaker covariance matrix B. This extension has shown to effectively reduce the influence of dataset variability on the investigated i-vector PLDA system in the context of the JHU 2013 domain adaptation challenge. When evaluated on a system trained on the Switchboard corpus, EER was decreased by 62%, DCF (old) by 58% and DCF (new) by 33%. These error reductions recover 85% of the degradation due to mismatched PLDA training (MIXER training is considered to be the matched condition).

Experiments conducted with three different data partitions for IDVC training indicate that the method works well even when trained on two subsets of data only and without speaker labels.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for inter-dataset variability compensation in a speaker recognition system, the method comprising:
   operating at least one hardware processor of a speaker recognition system to compensate for inter-dataset variability, by:
   receiving a heterogeneous development dataset comprising: multiple samples embodied as digital files, and digital metadata associated with at least some of the multiple samples;
   dividing the multiple samples into multiple homogenous subsets, based on the digital metadata;
   computing a statistical measure of high-level features of each of the multiple homogenous subsets, to produce multiple central high-level features for the multiple homogenous subsets, respectively;
   computing an inter-dataset variability subspace spanned by the multiple central high-level features;
   removing the inter-dataset variability subspace from the high-level features of the multiple homogenous subsets, to produce denoised samples;
   training the speaker recognition system using the denoised samples; and
   performing speaker recognition using the trained speaker recognition system.

2. The method according to claim 1, wherein the high-level features are selected from the group consisting of:
   i-vectors,
   GMM (Gaussian Mixture Model) supervectors,
   HMM (Hidden Markov Model) supervectors,
   d-vectors,
   JFA (Joint Factor Analysis) supervectors,
   LBP (Local Binary Patterns),
   HOG (Histograms of Oriented Gradients), and
   EBIF (Early Biologically-Inspired Features).

3. The method according to claim 2, wherein the speaker recognition system is selected from the group consisting of:
   a PLDA (Probabilistic Linear Discriminant Analysis)-based system,
   an SVM (Support Vector Machine)-based system,
   a neural network-based system,
   a NAP (Nuisance Attribute Projection)-based system,
   a WCCN (Within-Speaker Covariance Matrix)-based system, and
   an LDA (Linear Discriminant Analysis)-based system.

4. The method according to claim 3, wherein the multiple samples are speech samples.

5. The method according to claim 4, wherein the heterogeneous development dataset is devoid of speech samples from a target domain of the speaker recognition.

6. The method according to claim 4, wherein the metadata comprises at least one parameter selected from the group consisting of: speaker gender, spoken language and recordation setting.

7. The method according to claim 4, wherein the computing of the inter-dataset variability subspace comprises PCA (Principal Component Analysis).

8. A method comprising:
   operating at least one hardware processor of a PLDA (Probabilistic Linear Discriminant Analysis) speaker recognition system to compensate for inter-dataset variability, by:
   receiving a heterogeneous development dataset comprising multiple speech samples;
   dividing the multiple speech samples into multiple homogenous subsets;
   for each subset i of the multiple homogenous subsets: (a) estimating PLDA hyper-parameters $\{\mu_i, B_i, W_i\}$, wherein $\mu$ denotes a center of an i-vector space, B denotes a between-speaker covariance matrix and W denotes a within-speaker covariance matrix, and (b) computing an i-vector subspace $S_\mu$ corresponding to $\{\mu_i\}$, an i-vector subspace $S_W$ corresponding to $\{W_i\}$, and an i-vector subspace $S_B$ corresponding to $\{B_i\}$;
   joining i-vector subspaces $S_\mu$, $S_W$ and $S_B$ into a single subspace S;
   removing subspace S from i-vectors of the multiple speech samples, to produce denoised speech samples;
   training the PLDA speaker recognition system using the denoised speech samples; and
   performing speaker recognition using the trained PLDA speaker recognition system.

9. The method according to claim 8, further comprising smoothing B by linear interpolation using an estimated diagonal of B.

10. The method according to claim 8, wherein:
    the heterogeneous development dataset further comprises metadata associated with at least some of the multiple speech samples; and
    the dividing is based on the metadata.

11. The method according to claim 8, wherein the computing of each of the i-vector subspaces $S_\mu$, $S_W$ and $S_B$ comprises PCA (Principal Component Analysis).

12. The method according to claim 8, further comprising computing an average of squared $\{W_i\}$, and finding a k number of largest eigenvalues of the squared $\{W_i\}$, wherein the k largest eigenvalues span the i-vector subspace $S_W$.

13. The method according to claim 12, further comprising whitening the i-vector subspace $S_W$ with respect to W.

14. The method according to claim 8, further comprising computing an average of squared $\{B_i\}$, and finding an m number of largest eigenvalues of the squared $\{B_i\}$, wherein the k largest eigenvalues span the i-vector subspace $S_B$.

15. The method according to claim 14, further comprising whitening the i-vector subspace $S_B$ with respect to B.

16. A computer program product for inter-dataset variability compensation for speaker recognition, the computer program product comprising a non-transitory computer-readable storage medium having program code embodied therewith, the program code executable by at least one hardware processor of a PLDA (Probabilistic Linear Discriminant Analysis) speaker recognition system to:
   compensate for inter-dataset variability in the PLDA speaker recognition system, by:

receiving a heterogeneous development dataset comprising multiple speech samples;

dividing the multiple speech samples into multiple homogenous subsets;

for each subset i of the multiple homogenous subsets: (a) estimating PLDA (Probabilistic Linear Discriminant Analysis) hyper-parameters $\{\mu_i, B_i, W_i\}$, wherein $\mu$ denotes a center of an i-vector space, B denotes a between-speaker covariance matrix and W denotes a within-speaker covariance matrix, and (b) computing an i-vector subspace $S_\mu$ corresponding to $\{\mu_i\}$, an i-vector subspace $S_W$ corresponding to $\{W_i\}$, and an i-vector subspace $S_B$ corresponding to $\{B_i\}$;

joining i-vector subspaces $S_\mu$, $S_W$ and $S_B$ into a single subspace S;

removing subspace S from i-vectors of the multiple speech samples, to produce denoised speech samples;

training the PLDA speaker recognition system using the denoised speech samples; and performing speaker recognition using the trained PLDA speaker recognition system.

17. The computer program product according to claim 16, wherein the program code is further executable by the at least one hardware processor to smooth B by linear interpolation using an estimated diagonal of B.

18. The computer program product according to claim 16, wherein:

the heterogeneous development dataset further comprises metadata associated with at least some of the multiple speech samples; and the dividing is based on the metadata.

19. The computer program product according to claim 16, wherein the computing of each of the i-vector subspaces $S_\mu$, $S_W$ and $S_B$ comprises PCA (Principal Component Analysis).

20. The computer program product according to claim 16, wherein the program code is further executable by the at least one hardware processor to:

compute an average of squared $\{W_i\}$;

find a k number of largest eigenvalues of the squared $\{W_i\}$, wherein the k largest eigenvalues span the i-vector subspace $S_W$;

whiten the i-vector subspace $S_W$ with respect to W;

compute an average of squared $\{B_i\}$;

find an m number of largest eigenvalues of the squared $\{B_i\}$, wherein the m largest eigenvalues span the i-vector subspace $S_b$; and whiten the i-vector subspace $S_B$ with respect to B.

* * * * *